UNITED STATES PATENT OFFICE.

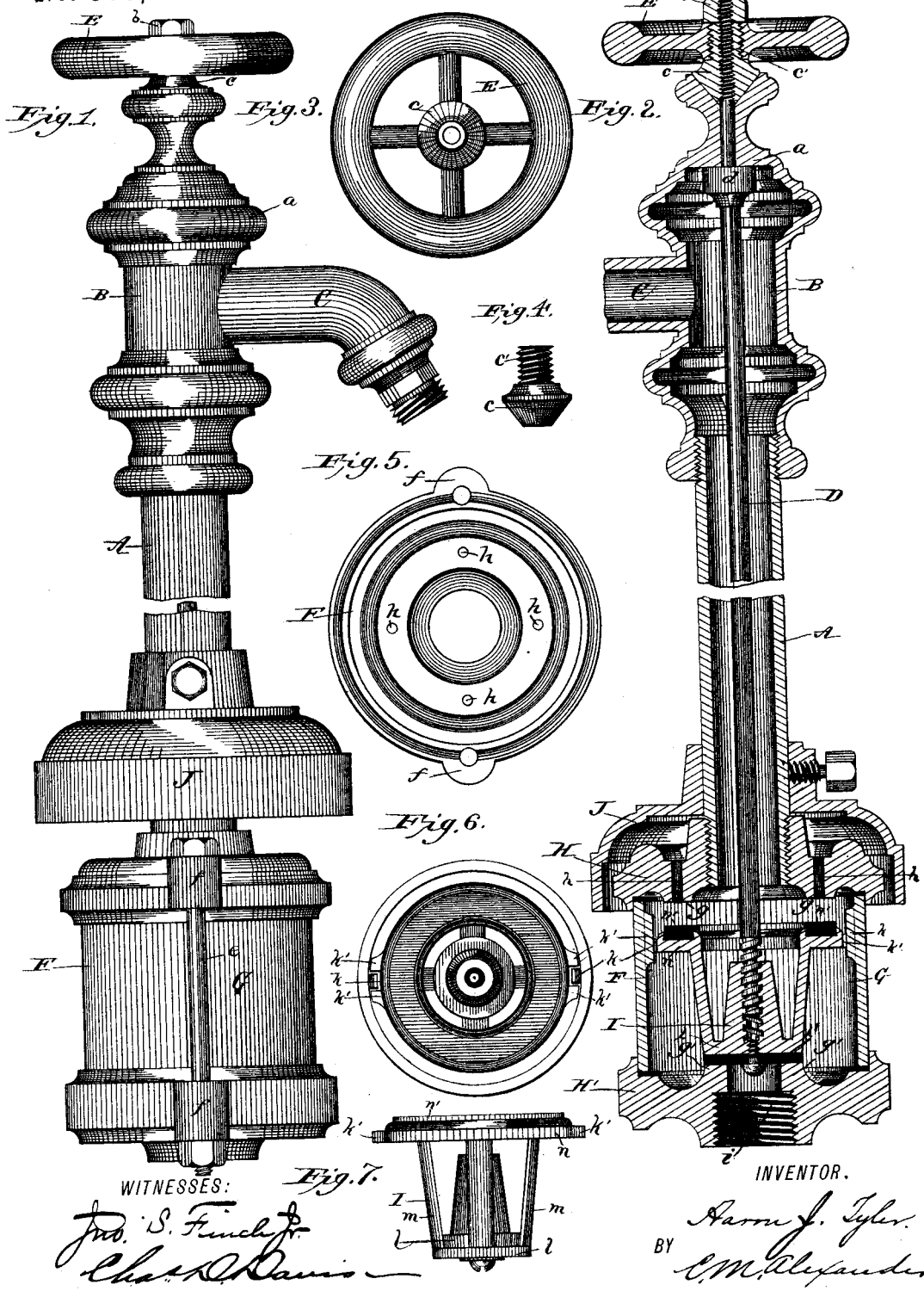

AARON J. TYLER, OF ALBION, NEW YORK.

HYDRANT.

SPECIFICATION forming part of Letters Patent No. 388,798, dated August 28, 1888.

Application filed May 4, 1888. Serial No. 272,792. (No model.)

*To all whom it may concern:*

Be it known that I, AARON J. TYLER, a citizen of the United States, residing at Albion, in the county of Orleans and State of New York, have invented certain new and useful Improvements in Hydrants, of which the following is a specification, reference being had therein to the accompanying drawings.

My invention has relation to certain new and useful improvements in hydrants; and it has for its object to provide an extremely simple and inexpensive hydrant that will have but few working parts to get out of order, and which will at the same time be positive and reliable in operation, as will fully hereinafter appear.

The invention consists in certain novel features of construction and arrangements of parts, that will be hereinafter fully described, and particularly pointed out in the claims appended.

The invention is fully illustrated in the accompanying drawings, in which—

Figure 1 represents a side elevation of my improved hydrant; Fig. 2, a vertical longitudinal sectional view of the same; Fig. 3, a view of the operating or hand wheel inverted; Fig. 4, a side elevation of the conical nut attached to hand-wheel to prevent leakage of water around valve-rod when valve is open; Fig. 5, a plan view of the valve-casing detached from stand-pipe; Fig. 6, a plan view of same with upper head removed to show the interior thereof; Fig. 7, a side elevation of valve detached.

Referring to the drawings by letters, A designates the stand-pipe, to the upper screw-threaded end of which is screwed the water-chamber B, this chamber being provided with female threads for this purpose. This chamber is closed at its upper end and provided with one or more lateral outlets, C. The letter D designates the vertical valve-rod, which extends up centrally through and is journaled in the head $a$ of the water-chamber B, and on its upper end has attached to it in any convenient manner a hand-wheel, E, in the present instance this hand-wheel being held on the valve-rods by means of a jam or lock nut, $b$, and a conical nut, $c$. The conical nut $c$ has a central longitudinal screw-threaded passage through it for the purpose of permitting it to be screwed upon the upper screw-threaded end of the valve-rod, and its upper cylindrical portion, $c'$, is provided with external screw-threads to enable the hand-wheel to be screwed to it. The nut $b$ upon the extreme upper end of the valve-rod serves to bind the parts securely together. The conical portion of the nut $c$ is fitted closely into a conical recess in the head $a$ of the water-chamber, and the valve-rod is held against vertical movement by means of a collar, $d$, secured upon the same and abutting against the lower side of the head $a$ of the water-chamber.

The lower end of the stand-pipe is provided with external screw-threads, whereby the valve casing F may be attached to it, the outlet-opening in the head H of the valve-casing being provided with similar female screw-threads. This valve-casing is composed of a short cylinder, G, clamped between two flanged heads, H H', by means of two or more vertical bolts, $e$, passing through ears $f$ upon the same, these bolts being provided with suitable tightening-nuts. The lower side of the upper head, H, is provided with a circular valve-seat, $g$, which surrounds the outlet-opening in this head, and formed vertically through this valve-seat and head of the casing is a series of waste-apertures $h$. The upper face of the lower head, H', is also provided with a valve-seat, $g'$, which surrounds the inlet-opening $i$ in the head.

Working in the short cylinder G, and adapted to alternately open and close the inlet $i$ and the waste-apertures $h$, is the double-seated valve I, which is guided vertically by means of the lugs $k$, formed on diametrically opposite sides of the interior of the said cylinder G, these lugs being embraced by the lugs $k'$ $k'$, formed on the valve, as shown in Fig. 6. This valve is preferably cast in a single piece, and consists, essentially, of a disk, $l$, having rising from its edge the slightly-diverging vertical pillars $m$, which support a ring, $n$, this ring $n$ having formed on its periphery the above-mentioned guiding-lugs $k'$. The lower disk, $l$, is adapted to bear, through the medium of a packing-ring, $l'$, secured thereto, upon the seat $g'$ around the inlet-opening and close the same, and the ring $n$ is adapted to bear through the medium of a packing-ring, $n'$, inserted in a groove in the same upon the seat $g$ and close the waste-apertures $h$.

The valve I is adjusted vertically by means of the valve-rod, the lower end of the same being screw-threaded and working in a female screw-threaded aperture in a boss formed upon the upper face of the disk $l$. I prefer this method of operating the valve; but it is evident that I may use other methods without departing from the spirit of this invention.

Secured adjustably by means of a set-screw, or formed integral with the stand-pipe, is a hood, J, which overhangs the upper head, H, of the valve-casing, thereby protecting the waste-apertures and preventing them from becoming clogged. When the double-seated valve is elevated by means of the valve-rod, the inlet-opening $i'$ is opened and the waste-aperture closed, thus permitting the water to flow freely through the hydrant to the outlet C, and when the valve is lowered the inlet-opening is closed, so as to shut off the flow of water, and the waste-apertures are opened, permitting the water in the stand-pipe to run off into the surrounding earth, as usual.

It will be observed that when the valve is opened to permit the water to flow through the hydrant the pressure of the ring $n$ of the valve against its seat will exert a firm downward pull upon the valve-rod, serving to force the conical nut $c$ closely in its conical seat in the head $a$, and thereby prevent the water from leaking out through the valve-rod opening.

It is evident that I may form the conical nut $c$ integral with the hand-wheel without departing from the spirit of the invention.

Having thus fully described my invention, what I claim as new, and desire to secure by Letters Patent, is—

1. The combination, with a stand-pipe, a water-chamber, B, attached to the upper end thereof, the head of this water-chamber being provided with a conical depression in its upper face, a valve-casing attached to the lower end of stand-pipe and provided with a valve-seat, $g$, waste-apertures being formed through this valve-seat, a vertically-movable valve in the casing F, adapted to close against the seat $g$ and close the waste-apertures, a valve-rod for operating this valve, this valve-rod being journaled in the head of the water-chamber and provided with a conical enlargement, $c$, adapted to fit the conical depression in the head of the water-chamber, substantially as described.

2. In a hydrant, the combination of the stand-pipe provided with a water-chamber on its upper end and a valve-casing on its lower end, a vertically-working valve in the said casing, a valve-rod for operating this valve, this valve rod being journaled in the head of the water chamber and provided with a collar, $d$, a conical nut, $c$, screwed to the upper end of the valve-rod and adapted to fit closely a conical depression in the head of the water chamber, a hand-wheel screwed on this nut $c$, and a lock-nut, $b$, screwed on the projecting end of the valve-rod, substantially as described.

3. The combination, with a stand-pipe, water-chamber, and a valve-rod, of the valve-casing consisting of a vertical cylinder, G, secured between two heads, H H', the upper head, H, being provided with waste-apertures $h$, the valve I, working vertically in the cylinder G, and consisting, essentially, of the upper ring, $n$, and lower disk, $l$, connected by vertical pillars $m$, the said valve being adapted to alternately close the waste and inlet openings, and the packing-rings, substantially as and for the purpose herein set forth.

4. The combination, with the stand-pipe, and the valve-casing F, secured to the lower end of the stand-pipe, this valve-casing consisting of a short cylinder and two heads, H H', these heads being provided, respectively, with the valve-seats $g$ $g'$, the former valve-seat being provided with waste-apertures $h$ and surrounding the outlet in the head H, of the vertically-working valve I, inclosed in the said casing F and consisting of the upper ring, $n$, and a disk, $l$, connected with the said ring by vertical pillars $m$, packings secured to the said ring $n$ and disk $l$, and a valve-rod for operating the said valve I, this valve I being adapted to alternately close against the valve-seats $g$ $g'$, substantially as described.

In testimony whereof I affix my signature in presence of two witnesses.

AARON J. TYLER.

Witnesses:
JNO. S. FINCH, Jr.,
C. D. DAVIS.